United States Patent
Truitt

(10) Patent No.: US 8,617,262 B2
(45) Date of Patent: Dec. 31, 2013

(54) CONDENSATION OF GLYCOLS TO PRODUCE BIOFUELS

(75) Inventor: Matthew J. Truitt, Bartlesville, OK (US)

(73) Assignee: Phillips 66 Company, Houston, TX (US)

(*) Notice: Subject to any disclaimer, the term of this patent is extended or adjusted under 35 U.S.C. 154(b) by 293 days.

(21) Appl. No.: 13/308,041

(22) Filed: Nov. 30, 2011

(65) Prior Publication Data
US 2012/0144733 A1   Jun. 14, 2012

Related U.S. Application Data

(60) Provisional application No. 61/421,509, filed on Dec. 9, 2010.

(51) Int. Cl.
*C10L 1/185* (2006.01)

(52) U.S. Cl.
USPC .................................. 44/448; 44/447; 44/449

(58) Field of Classification Search
USPC .................................................... 44/447–449
See application file for complete search history.

(56) References Cited

U.S. PATENT DOCUMENTS

| | | | |
|---|---|---|---|
| 5,177,301 A * | 1/1993 | Knifton | 585/855 |
| 6,228,789 B1 | 5/2001 | Wu et al. | |
| 7,049,476 B1 | 5/2006 | O'Lenick, Jr. | |
| 2008/0300435 A1 | 12/2008 | Cortright | |
| 2008/0302001 A1 | 12/2008 | Koivusalmi et al. | |
| 2010/0094062 A1 | 4/2010 | Rabello et al. | |

OTHER PUBLICATIONS

Klepacova, K., et al., "Etherification of Glycerol and Ethylene Glycol by Isobutylene." Applied Catalysis A: General 328: 1-13 (2007).
Klepacova, K., et al., "tert-Butylation of Glycerol Catalyzed by Ion-Exchange Resins." Applied Catalysis A: General 294: 141-147 (2005).
Karinen, R. et al., "New Biocomponents from Glycerol" Applied Catalysis A: General 306: 128-133 (2006).
Frusteri, F., et al., "Catalytic Etherification of Glycerol by tert-Butyl Alcohol to Produce Oxygenated Additives for Diesel Fuel." Applied Catalysis A: General 367: 77-83 (2009).
Tijm, P. et al., "Effect of Oxygenated Cetane Improver on Diesel Engine Combustion & Emissions" http://www.energy.psu.edu/tr/cetane.html, Mar. 2, 2012.
Murphy, M. et al., "Compendium of Experimental Cetane Number Data" NREL/SR-540-36805 (2004). http://www.nrel.gov/vehiclesandfuels/pdfs/sr368051.pdf, Sep. 2004.

* cited by examiner

*Primary Examiner* — Brian McCaig
(74) *Attorney, Agent, or Firm* — Phillips 66 Company

(57) ABSTRACT

The present disclosure relates to methods for converting light glycol streams of biological origin into products suitable for use as oxygenated fuel additives. These methods involve the acidic condensation of light glycols to form larger products, termed low molecular weight poly-glycols. The remaining hydroxyl functional groups of the poly-glycol products are then modified to decrease the overall polarity of the products, and improve their suitability for use as an oxygenated fuel additive.

20 Claims, 2 Drawing Sheets

CONDENSATION OF GLYCOLS TO PRODUCE BIOFUELS

CROSS-REFERENCE TO RELATED APPLICATIONS

This application is a non-provisional application which claims benefit under 35 USC §119(e) to U.S. Provisional Application Ser. No. 61/421,509 filed Dec. 9, 2010, entitled "CONDENSATION OF GLYCOLS TO PRODUCE BIOFUELS," which is incorporated herein in its entirety.

STATEMENT REGARDING FEDERALLY SPONSORED RESEARCH OR DEVELOPMENT

None.

FIELD OF THE INVENTION

The present disclosure relates to the field of biomass-derived transportation fuels. More specifically, it relates to methods for converting light glycol feeds originating from biomass into polyglycol products suitable for use as a bio-derived fuel or cetane-enhancing fuel additive.

BACKGROUND

There is a great interest in the discovery of alternative sources of fuels and chemicals from resources other than petroleum. Development of non-petroleum-based liquid transportation fuels may provide economic and environmental benefits, while also increasing national security by decreasing reliance on non-domestic energy sources. Biomass, such as plants and animal fats, represent a major alternative source of hydrocarbons that can be converted into fuels. Liquid fuels derived from biomass are rapidly entering the market, driven by both need for increased national energy independence and rapid fluctuations in the cost of petroleum products. In 2007, the Energy Independence and Security Act was passed in the United States, which requires increasing quantities of bio-derived fuels to be produced over time. Similarly, the European Union directive 2003/30/EC promotes the use of biofuels or other renewable fuels. The directive has set a minimum percentage of biofuels to replace diesel or gasoline for transport purposes so, that by the end of 2010 there should be a 5.75% minimum proportion of biofuels in all gasoline and diesel fuels sold. To meet these mandates, it is essential to develop more efficient processes to convert bio-derived compounds into fuels that can fulfill these government mandates, as well as future global energy needs.

The carbohydrates found in plants and animals can be used to produce fuel range hydrocarbons. However, many carbohydrates (e.g., starch) are undesirable as feed stocks for creating biomass-derived fuels due to the costs associated with converting them to a useable form. The chemical structure of some carbohydrates makes them difficult to convert, and conversion processes may produce low yields of desirable products. Carbohydrates that are difficult to convert include compounds with low effective hydrogen to carbon ratios, including carbohydrates such as starches and sugars, and other oxygenates with low effective hydrogen including carboxylic acids and anhydrides, light glycols, glycerin and other polyols and short chain aldehydes. As such, development of an efficient and inexpensive process for converting one or more of these difficult-to-convert biomass feedstocks into a form suitable for use as a fuel additive could be a significant contribution to the art and to the economy.

Glycerol is a significant side-product of the trans-esterification reaction utilized to convert plant oils and animal fats into biofuels, and some work has been done examining ways to utilize glycerol. Karinen, et al. have reported methods for the etherification of glycerol and isobutene, while papers by Frustieri, et al. and Keplacova, et al., both include methods for catalytic etherification of glycerol by tert-butyl alcohol. U.S. Patent App. Pub. US2010/0094062 describes a process for the etherification of glycerol with an alkene or alkyne, followed by nitration of a remaining hydroxyl group. A portion of the process claimed in US2008/0300435 pertains to the dimerization/condensation of alcohols such as pentanol or isopropyl alcohol. However, to date, no methods have demonstrated an efficient process for the etherification of biologically-derived light glycol feedstock, such as ethylene glycol or propylene glycol, that results in a product suitable for subsequent use as a fuel additive.

BRIEF SUMMARY

Towards this goal, we disclose herein a novel process for efficiently converting biomass-derived light glycols, such as ethylene glycol and propylene glycol, into low molecular weight poly-glycol products useful as oxygenated cetane enhancers in transportation fuels. Whereas glycerol is a common byproduct of transesterification processes, light glycol streams are often obtained by the moderate hydrogenolysis of larger biomass-derived oxygenates such as alditols, cleaving backbone carbon-carbon linkages to form this feed. Glycols are easier to utilize as feedstock than their parent alditols in that glycols are liquids at room temperature and may be distilled to remove impurities rather than having to rely on other purification techniques (e.g. ion-exchange for metals removal). In contrast, alditols in the five to six carbon range are solids at room temperature and tend to decompose when heated above their melting points. Unlike some unsaturated biomass derived oxygenates, glycols are stable and may be stored long term without special measures to prevent degradation.

Unfortunately, glycols are not suitable for direct blending into fuels due to miscibility issues. However, converting these glycols to low molecular weight poly-glycols (LMWPG) helps resolve this problem. During the conventional processing of hydrocarbons to produce fuels, removing oxygen involves reacting oxygen containing compounds with hydrogen to produce water. However, the underlying chemistry behind the conversion of the present disclosure involves acid-catalyzed condensation reactions that do not require hydrogen for oxygen removal. This reduces greenhouse gas emissions while also reducing the operational cost associated with production of hydrogen. Some oxygen from the feed is left in the final product resulting in the product maintaining much of the volume of the original starting material. Finally, these condensation reactions may be conducted at much lower temperatures than conventional oxygen removal processes, resulting in further savings.

The present disclosure pertains to using solid acidic catalysts to convert biomass-derived glycols into di-, tri-, and some larger low molecular weight polyglycols (LMWPG), followed by steps to increase miscibility of the LMWPG with liquid hydrocarbon fuels. Derivatives of these LMWPG fall into a category of materials termed oxygenated cetane improvers, which are larger, predominantly linear compounds with oxygen substituted for carbon periodically along the backbone. The oxygen content of oxygenated cetane improvers varies depending on the feedstream used in their formation. However, a National Renewable Energy Laboratory report by Murphy, et al. shows that number of polyglycols have been calculated to possess a high cetane number. In addition, preliminary findings by Tijm, et. al. have shown that several LMWPG, when added to premium diesel fuel at 10-11% (by wt.), reduce particulate emissions during combustion by up to 28% versus unmodified premium diesel.

Certain embodiments of the invention disclosed herein provide a process for converting glycols (such as, for example, ethylene glycol and propylene glycol) into products suitable for use as fuel additives that comprises the steps of: (a) providing a biomass-derived feedstream comprising light glycols, where the glycols contain two, three or four carbon atoms, (b) contacting the feedstream with a first catalyst in a reactor, where the contacting results in an acidic condensation reaction that converts a least a portion of the feedstream to condensation products, and where said condensation products possess at least 4 carbon atoms and one ether functional group, (c) converting at least a portion of the remaining hydroxyl functional groups on the condensation products from step (b) to ether functional groups by combining the condensation products with a second catalyst to produce a liquid hydrocarbon mixture suitable for use as an additive to liquid hydrocarbon fuels, wherein the converting takes place in the presence of an olefin, monofunctional alcohol or mixtures thereof, and wherein the liquid hydrocarbon mixture has increased miscibility in liquid hydrocarbon fuels as a result of step c).

Certain alternative embodiments of the invention disclosed herein provide a process for converting glycols (such as, for example, ethylene glycol and propylene glycol) into products suitable for use as fuel additives that comprises the steps of: (a) providing a biomass-derived feedstream comprising light glycols, where the glycols contain two, three or four carbon atoms, (b) contacting the feedstream with a first catalyst in a reactor, where the contacting results in an acidic condensation reaction that converts a least a portion of the feedstream to condensation products, and where said condensation products possess at least 4 carbon atoms and one ether functional group, (c) reducing at least a portion of the remaining hydroxyl groups on the condensation products by combining the condensation products with a second catalyst in the presence of hydrogen to produce water and a liquid hydrocarbon mixture that is suitable for use as an additive for a liquid hydrocarbon fuel. This liquid hydrocarbon mixture has increased miscibility in liquid hydrocarbon fuels as a result of this reduction step. In certain embodiments, the functions of the first and second catalyst are performed by the same catalyst.

In certain embodiments, the process additionally comprises combining the liquid hydrocarbon mixture of step (c) with a liquid hydrocarbon fuel to produce an improved liquid hydrocarbon fuel, wherein the improved liquid hydrocarbon fuel has improved combustion properties that may include increased cetane number, decreased emissions of environmental pollutants during combustion, or both.

The first catalyst may comprise at least two elements, one selected from Group 4 of the periodic table, and the other selected from Group 6 of the periodic table. Alternatively, the first catalyst may be a microporous molecular sieve selected from the group consisting of crystalline silicoaluminophosphates and aluminosilicates, that has been chemically treated to decrease catalytic activity outside the internal channels of the catalyst. Preferably, the pore diameter of the molecular sieve catalyst restricts the formation of circular products inside its pores.

In certain embodiments, the second catalyst may be an acidic macroreticular ion-exchange resin. In other embodiments, the second catalyst may be a microporous molecular sieve selected from the group consisting of crystalline silicoaluminophosphates and aluminosilicates, that has been chemically treated to decrease catalytic activity outside the internal channels of the catalyst.

DETAILED DESCRIPTION

Figure 1:
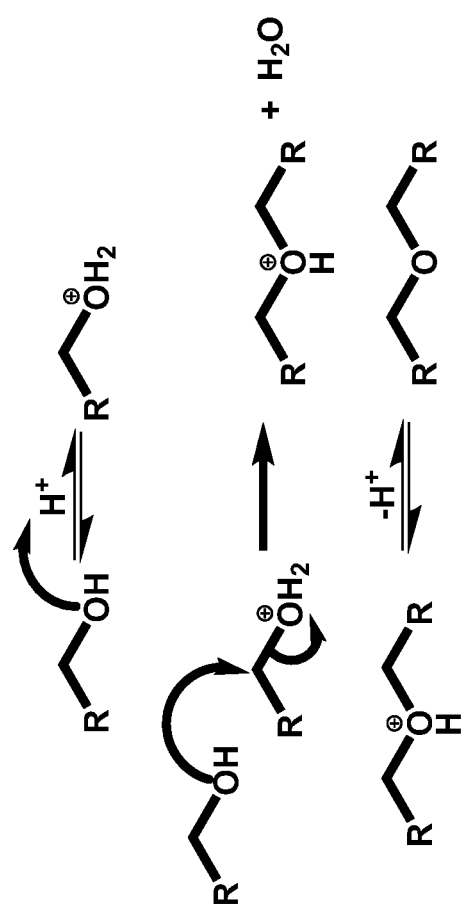
FIG. 1 illustrates an acidic condensation of the current disclosure also referred to as etherification.

Process conditions for conducting condensation reactions are relatively mild when compared to other industrial processes, such as conventional naphtha hydrodesulfurization, which normally requires temperatures in the range of 285° C. to 370° C. Low temperatures are advantageous since at higher temperature elimination becomes a competing reaction mechanism. Elimination, like condensation, involves the removal of a small molecule from a parent, but there is no coupling associated with the reaction. Elimination results in the production of an unsaturated product (e.g., ethanol to ethylene.) While these limits exist, yields for this process are typically sufficient to operate at the commercial level for chemical production. The acidic condensation of the current disclosure could also be referred to as etherification, and is illustrated in FIG. 1. Depicted in the first line, the acid catalyst donates a proton to a hydroxyl group of a first glycol molecule. By definition, a glycol is a diol where the two hydroxyl groups are attached to different carbons. Thus, the R groups shown in FIG. 1 represent a hydrocarbon chain comprising a second hydroxyl moiety. Referring to the second line of FIG. 1, a hydroxyl group from a second glycol molecule to reacts with the electrophilic carbon adjacent to the proton-accepting hydroxyl. Finally, the third line of FIG. 1 depicts removal of a water molecule (and proton) forming an ether bond between the two glycols. Acid-catalyzed condensation of primary alcohols in the homogeneously catalyzed case occurs via an $S_N 2$ mechanism. In this type of mechanism, the transition state involves the attacking nucleophile driving off the leaving group in a concerted mechanism. This acid catalyzed condensation reaction is distinct from the base-catalyzed condensation reaction developed by Guerbet, which instead produces branched, saturated alcohols and not ethers. Examples of the Guerbet condensation reaction being utilized to form saturated branched hydrocarbons are shown in U.S. Pat. No. 7,049,476 and US2008/0302001.

Typical biomass-derived molecules suitable for conversion to LMWPG by the processes described herein include any diol comprising two to four carbon atoms. Examples include ethylene glycol, propylene glycol, 1,3-propanediol, 1,2,-butanediol, 1,3,-butanediol, 2,3-butanediol, and 1,4-butanediol.

As mentioned above, it is possible to convert glycols into di-, tri-, and some larger LMWPG using a solid acidic catalyst. Derivatives of these LMWPG fall into a category of materials termed oxygenated cetane improvers. Oxygenated cetane improvers are larger, predominantly linear compounds with oxygen substituted for carbon periodically along the backbone. The oxygen content of oxygenated cetane improvers varies depending on the feedstream used in their formation. However, a National Renewable Energy Laboratory report by Murphy, et al. shows that number of polyglycols have been calculated to possess a high cetane number. In addition, preliminary findings by Tijm, et. al. have shown that several LMWPG, when added to premium diesel fuel at 10-11% (by wt.), reduce particulate emissions during combustion by up to 28% versus unmodified premium diesel.

The condensation reactions associated with the processes described herein are generally conducted at a temperature ranging from about 100° C. to about 300° C. More preferably, these reactions are conducted at a temperature ranging from about 120° to about 260° C. The condensation reactions are generally conducted at a pressure ranging from about 200 kPa to about 8000 kPa. Preferably, reactions are conducted at a pressure ranging from about 500 kPa to about 5000 kPa. Additionally, condensation reactions of the present disclosure are generally conducted with a feedstream flow rate ranging from about 0.1 h$^{-1}$ liquid weight hourly space velocity (LWHSV) to about 20 h$^{-1}$ LWHSV. Preferably, reactions are conducted with a feedstream flow rate ranging from about 0.5 h$^{-1}$ LWHSV to about 15 h$^{-1}$ LWHSV.

Figure 2:
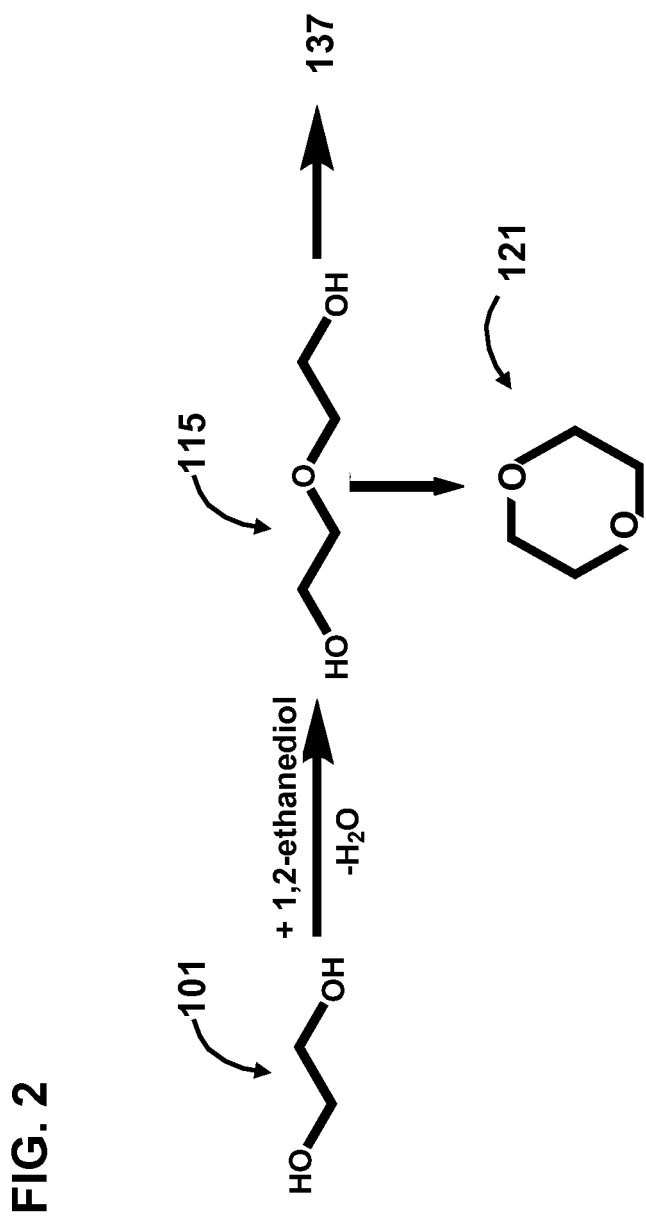
FIG. 2 illustrates outlines how a non-preferred cyclic product (p-dioxane) can be formed from the condensation product of two ethylene glycol molecules.

The condensation catalyst utilized may be any catalyst capable of condensing light glycols to produce LMWPG. Preferably, the catalyst is an acidic catalyst suitable for such reactions, such as tungstated zirconias (for example, $WO_3/ZrO_2$), metal loaded tungstated zirconias (for example, $Pt-WO_3/ZrO_2$), heteropoly acids (for example, $H_4SiW_{12}O_{40}$), supported sulfonic acids (for example, acidic Amberlyst™ ion-exchange resins [Rohm and Haas]). Other catalysts useful for such condensation reactions may include acidic metal oxide catalysts, such as niobium pentoxide. Preferably, the catalyst is a microporous molecular sieve selected from crystalline silicoaluminophosphates and aluminosilicates with a three-dimensional pore structure that selectively favors the production of linear condensation products within the pores of the zeolite, while minimizing production of undesirable cyclic secondary products. Such undesirable products include p-dioxane. FIG. 2 outlines how this non-preferred cyclic product 121 can be formed from the condensation product 115 of two ethylene glycol molecules 101.

In certain embodiments, the condensation catalyst is a surface-passivated zeolite (such as, for example, H-Y, H-USY, H-mordenite, or H-ZSM-5) that selectively favors the production of linear LMWPG within the internal pores of the zeolite, while further minimizing production of undesirable cyclic secondary products on the zeolite surface. P-dioxane is a bulky, cyclic structure that is less likely to form within the confines of a zeolite channel system at low temperatures. Selectivity toward the formation of LMWPG may be enhanced by surface passivation of the zeolite to block activity outside of the channel system. Methods for surface passivation of zeolites are familiar to those with knowledge in the art, and one example of a zeolite passivation procedure is provided in Example II of the current disclosure. Creating selectivity towards the favored primary poly-glycol product is important for the economic viability of the process at industrial scale, since p-dioxane is unsuitable for blending into fuels, and is a stable product that is difficult to convert back to a form that is useful as a biofuel component.

Following condensation of the light glycol feed to form a LMWPG, in certain embodiments the remaining hydroxyl groups are modified by an additional "capping" step to produce a poly-glycol derivative. This end-capping of the terminal hydroxyl groups may be accomplished by any catalyst capable of catalyzing an etherification reaction between the remaining terminal hydroxyl groups and an olefin. The end product would preferably have increased miscibility in liquid hydrocarbon fuels, and thus, be more suitable for use as a fuel additive. Such capping techniques are understood by individuals having knowledge in the art, and examples of such techniques are provided in the previously mentioned papers by Karinen, et. al., Frustieri, et. al. and Keplacova, et. al.

In certain alternative embodiments, the remaining hydroxyl groups that are present on the LMWPG following condensation of the light glycol feed are instead "capped" by an additional acidic condensation reaction in the presence of a monofunctional alcohol (such as, for example, methanol, ethanol or propanol). This step may be performed with the catalyst of step b), for example, or any other catalyst capable of catalyzing an etherification reaction between the remaining terminal hydroxyl groups of the LMWPG and the monofunctional alcohol. The monofunctional alcohol has only one functional group capable of participating in a further round of etherification, thus effectively preventing further growth of the polymer. The end product would preferably have increased miscibility in liquid hydrocarbon fuels, and thus, be more suitable for use as a fuel additive.

In still other embodiments, the remaining hydroxyl groups that are present on the LMWPG following condensation of the light glycol feed are instead "capped" by mild hydrodeoxygenation (HDO) of the remaining hydroxyl functional groups. It is important that the HDO step be mild so as to not completely remove all oxygen from the LMWPG, as a certain amount of oxygen in the final product is desirable. This HDO step may be catalyzed by any of a number of commercially available catalysts, including commercial hydrotreating catalysts comprising Co and Mo, or Ni and Mo. Procedures for conducting such HDO reactions are commonly known in the art. The end product would preferably have increased miscibility in liquid hydrocarbon fuels, and thus, be more suitable for use as a fuel additive.

EXAMPLES

The following examples are each intended to be illustrative of a specific embodiment of the present invention in order to teach one of ordinary skill in the art how to make and use the invention. They are not intended to limit the scope of the invention in any way.

Example I

Preparation of Catalysts: 40 wt % $H_4SiW_{12}O_{40}/SiO_2$ was prepared by incipient wetness impregnation. $H_4SiW_{12}O_{40}$ (Sigma-Aldrich) was dissolved in ethanol and added dropwise to Davicat SI 1103 (320 m$^2$/g, −40/+60 mesh.) Samples were sealed for 24 hours and then dried for 12 hours at 90° C. in flowing nitrogen.

1 wt % $Pt-WO_3/ZrO_2$ was prepared by precipitation of $Zr(OH)_4$ followed by the loadings of tungsten and platinum via incipient wetness impregnation. Pt was loaded onto the catalyst using aqueous hexachloroplatinic acid. Catalysts were dried at 150° C. for 6 hours, and calcined at 300° C. overnight in flowing air.

H-MOR (Si/Al=10), NH4-USY (Si/Al=2.6), and TPA-ZSM-5 (Si/Al=15) were obtained from Zeolyst International. Extrudates were crushed and sieved to −20/+40 mesh. Zeolites containing template or in the ammonium form were converted into the acidic form by calcining in a muffle furnace under flowing air prior to use. Excess air was flowed over the catalyst while the samples were heated using a gradual heat/soak temperature profile to a final temperature of 450° C. The final temperature was maintained overnight (>12 hours.)

Example II

Hypothetical Example: Passivation of a Zeolite Catalyst with Either Poly(phenylmethyl)siloxane or Tetraethylorthosilicate: Zeolite catalysts useful in certain embodiments of the invention may be chemically-modified to passivate (i.e., block active sites on) the external surface of the catalyst, thereby increasing selectivity for the production of LMWPG. One examples of how this can be achieved is outlined in U.S. Pat. No. 6,228,789, which pertains to a method for silylation of zeolite catalysts, and is incorporated herein by reference.

A zeolite H-ZSM-5 was contacted to incipient wetness with a 50 wt % solution of poly(phenylmethyl)siloxane (PPMS) in cyclohexane, and the catalyst was not pre-calcined prior to contacting. After loading of the catalyst, it was dried and calcined at 538° C. for 6 hrs. Alternatively, the H-ZSM-5 catalyst was loaded with a 50 wt. % solution of tetraethylorthosilicate (TEOS) under conditions identical to those used for loading with PPMS.

Example III

Catalytic Conversion Test Conditions: Unless otherwise noted, catalysts were tested in a standard, ¾-inch diameter down-flow reactor. A bed of heated glass beads was utilized upstream from the catalyst to preheat the feed to reaction temperature prior to contacting the catalyst. Typically 6 mL of catalyst was diluted in an inert material (alundum) to a constant 13 mL bed volume for screening runs. The reactor was heated using a three-zone Thermcraft™ furnace with independent temperature control for each zone. Liquid feed was delivered to the system by an ISCO™ 1000D syringe pump, and system pressure was controlled by a Tescom™ backpressure regulator. Samples were taken at one hour intervals, and conversion and selectivity percentages (unless otherwise noted) were calculated by averaging data obtained from three different samples taken at different time points.

Catalysts were dried in-situ at the desired operating temperature for a minimum period of 30 minutes in at least 100 sccm $H_2$ at 2758 kPa psig prior to each run. Pt containing catalysts were reduced for a minimum of 30 minutes at 300° C. and 2758 kPa in 100 sccm of $H_2$. Except as noted, runs were performed as follows: Ethylene glycol was obtained from Sigma-Aldrich™ (97% purity) and diluted to 50 vol. % in water, and was fed to the reactor at a constant liquid feed rate of 30 mL/hr. Reactions were typically performed at 200° C., 5.0 $h^{-1}$ LVHSV, and 2758 kPa. Hydrogen was flowed at 100 sccm during screening runs as some catalysts tested needed spillover hydrogen for activity. Liquid sample collection began 1 hour after starting the feed. Samples were acquired at 1 hour intervals for 5 hours and analyzed on an Agilent™ 7890A gas chromatograph equipped with an Agilent™ HP-5 capillary column, and a flame ionization detector (FID). Ambient temperature non-condensable products were analyzed on-stream using a HP-5 capillary column with FID detection.

Example IV

The tungstated zirconia catalyst Pt—$WO_3$/$ZrO_2$ was prepared as detailed in Example 1, and found to convert 18.5% (w/v) of the feed during the experiment. However, selectivity for the formation of LMWPG was only 1.7% (w/v). Instead, this catalyst produced a relatively large quantity of ethanol from the ethylene glycol feedstock. While not wishing to be limited by theory, it is hypothesized that this ethanol was formed by the intramolecular dehydration of ethylene glycol to form acetaldehyde, followed by reduction of the acetaldehyde at the Pt sites of the catalyst to form ethanol. Alternatively, ethanol may have formed through direct hydrogenolysis at Pt sites.

Example V

A member of the heteropoly acid catalyst family (with the formula $H_4SiW_{12}O_{40}$/$SiO_2$) was tested for its ability to convert the glycol feedstock to LMWPG. At a run temp of 250° C., utilizing undiluted ethylene glycol at a feed rate of 15 ml/hr, this catalyst converted 74.7% of the feedstock (average of samples taken at third and fourth hours), with a selectivity of 20.3% for the formation of LMWPG. However, this catalyst produced a large percentage of p-dioxane product, which is unsuitable for use as a biofuel, or a cetane-increasing fuel additive. p-dioxane is formed from the product of an intermolecular condensation between two ethylene glycols molecules. The primary product of this condensation, diethylene glycol, can undergo intramolecular condensation and circularize to form p-dioxane. This is not desirable, because p-dioxane is not suitable for use as a cetane-enhancing additive, and is a relatively stable product that is difficult to convert into back into a form that can be used as a fuel, or fuel additive.

Example VI

The zeolite catalysts USY, mordenite, and ZSM-5 were obtained and used with similar Si/Al ratios for comparison (the Si/Al ratios were 2.6, 10 and 15, respectively.) The relatively low Si/Al ratios were selected to maximize the acid site quantity for each catalyst. Each zeolite catalyst exhibited conversion of the ethylene glycol feed (See Table 1) to form LMWPG.

TABLE 1

Conversion of ethylene glycol to LMWPG by several zeolite catalysts.

| Catalyst | Si/Al Ratio | % Conv. | % Selectivity for LMWPG |
| --- | --- | --- | --- |
| H-USY | 2.6 | 0.6 | 58.2 |
| H-MOR (mordenite) | 10 | 4.7 | 6.2 |
| H-ZSM-5 | 15 | 15.8 | 61.5 |

Reaction products in addition to LMWPG were observed, including acetaldehyde and p-dioxane. The acetaldehyde was hypothesized to have formed by the intramolecular dehydration of ethylene glycol, while p-dioxane was thought to have formed by the mechanism outlined previously. Interestingly, the USY and ZSM-5 zeolites exhibited higher selectivity for the production of LMWPG than with the other catalysts tested previously.

Example VII

The ZSM-5 zeolite catalyst was selected for further testing to optimize reaction conditions for converting the ethylene glycol feed stock to LMWPG. Conditions of pressure, temperature and flow rate were altered, and the effect on percent conversion and selectivity for the formation of LMWPG is shown in Table 2:

TABLE 2

Conversion of ethylene glycol to LMWPG at various reaction conditions:

| Run | % Conversion | % Selectivity | Temp. (° C.) | Pressure (KPa) | LWHSV ($hr^{-1}$) |
| --- | --- | --- | --- | --- | --- |
| 1 | 1.20 | 71.7 | 126.5 | 689 | 1.5 |
| 2 | 0.14 | 53.6 | 126.5 | 689 | 15.0 |
| 3 | 0.45 | 93.2 | 124.5 | 2758 | 1.5 |

TABLE 2-continued

Conversion of ethylene glycol to LMWPG at various reaction conditions:

| Run | % Conversion | % Selectivity | Temp. (° C.) | Pressure (KPa) | LWHSV (hr$^{-1}$) |
|---|---|---|---|---|---|
| 4 | 0.55 | 92.8 | 128 | 2758 | 1.5 |
| 5 | 0.21 | 100 | 126.5 | 2758 | 15.0 |
| 6 | 0.96 | 87.4 | 134.5 | 689 | 15.0 |
| 7 | 0.11 | 71.5 | 149 | 1724 | 8.25 |
| 8 | 1.60 | 85.4 | 154.5 | 1724 | 8.25 |
| 9 | 40.60 | 62.4 | 174 | 689 | 1.5 |
| 10 | 3.60 | 42.4 | 175.5 | 689 | 15.0 |
| 11 | 48.90 | 59.7 | 177.5 | 2758 | 1.5 |
| 12 | 1.80 | 84.5 | 174.5 | 2758 | 15.0 |
| 13 | 53.30 | 56.2 | 183.5 | 689 | 1.5 |
| 14 | 5.50 | 81.0 | 182 | 2758 | 15.0 |

DEFINITIONS

As used herein, the term "liquid weight hourly space velocity" or "LWHSV" refers to the liquid weight hourly space velocity.

As used herein, the term "cetane" or "cetane number" refers to the cetane number of a fuel as measured by the ASTM (American Society for Testing and Materials) D613 or D6890 standard.

As used herein, the term "transportation fuel" refers to any liquid hydrocarbon mixture used as a fuel for powering engines, including gasoline, diesel and jet fuels.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed and certain features of the invention may be utilized independently, all as would be apparent to one skilled in the art after having the benefit of this description of the invention. Changes may be made in the elements described herein without departing from the spirit and scope of the invention as described in the following claims.

REFERENCES

All of the references cited herein are expressly incorporated by reference. Incorporated references are listed again here for convenience:
1. US2010/0094062 (Rabello; Ferreiral; Menenzes); "Cetane Number Increasing Process and Additive for Diesel Fuel."
2. US2008/0300435 (Cortright; Blommel); "Synthesis of Liquid Fuels and Chemicals From Oxygenated Hydrocarbons."
3. US2008/0302001 (Koivusalmi; Piiola; Aalto) "Process for Producing Branched Hydrocarbons."
4. U.S. Pat. No. 7,049,476 (O'Lenick, Jr.) "Guerbet Polymers" (2006).
5. U.S. Pat. No. 6,228,789 (Wu; Drake) "Silylated Water Vapor Treated Zinc or Gallium Promoted Zeolite and Use Thereof for the Conversion of Non-aromatic Hydrocarbons to Olefins and Aromatic Hydrocarbons" (2001).
6. Klepacova, K., et al., "Etherification of Glycerol and Ethylene Glycol by Isobutylene." Applied Catalysis A: General 328: 1-13 (2007).
7. Klepacova, K., et al., "tert-Butylation of Glycerol Catalyzed by Ion-Exchange Resins." Applied Catalysis A: General 294: 141-147 (2005).
8. Karinen, R. et al., "New Biocomponents from Glycerol" Applied Catalysis A: General 306: 128-133 (2006).
9. Frusteri, F., et al., "Catalytic Etherification Of Glycerol By tert-Butyl Alcohol To Produce Oxygenated Additives For Diesel Fuel." Applied Catalysis A: General 367: 77-83 (2009).
10. Tijm, P. et al., "Effect of Oxygenated Cetane Improver on Diesel Engine Combustion & Emissions" http://www.energy.psu.edu/tecetane.html
11. Murphy, M. et al., "Compendium of Experimental Cetane Number Data" NREL/SR-540-36805 (2004). http://www.nrel.gov/vehiclesandfuels/pdfs/sr368051.pdf

I claim:

1. A process comprising the steps of:
    (a) providing a biomass-derived feedstream comprising light glycols, wherein said glycols comprise molecules containing two, three or four carbon atoms;
    (b) contacting the feedstream of step (a) with a first catalyst in a reactor, wherein the contacting results in an acidic condensation reaction that converts a least a portion of the feedstream to condensation products, wherein said condensation products comprise at least 4 carbon atoms at least one ether functional group, and one or more remaining hydroxyl functional groups;
    (c) converting at least a portion of the remaining hydroxyl functional groups on the condensation products from step (b) to ether functional groups by combining the condensation products with a second catalyst to produce a liquid hydrocarbon mixture suitable for use as an additive to liquid hydrocarbon fuels,
        wherein the converting takes place in the presence of an olefin, monofunctional alcohol or mixtures thereof,
        wherein the liquid hydrocarbon mixture has increased miscibility in liquid hydrocarbon fuels as a result of step c).

2. The process of claim 1, wherein the feedstream of step (a) comprises a member selected from the group consisting of ethylene glycol, propylene glycol, 1,3-propanediol, 1,2,-butanediol, 1,3,-butanediol, 2,3-butanediol, 1,4-butanediol and mixtures thereof.

3. The process of claim 1, further comprising combining the liquid hydrocarbon mixture of step (c) with a liquid hydrocarbon fuel to produce a improved liquid hydrocarbon fuel,
    wherein the improved liquid hydrocarbon fuel has improved combustion properties relative to the original liquid hydrocarbon transportation fuel,
    wherein said combustion properties comprise a member selected from the group consisting of increased cetane number, decreased emissions of environmental pollutants during combustion and combinations thereof.

4. The process of claim 1, wherein the contacting of step (b) is conducted at a temperature in the range of about 100° to about 300° C., and at a pressure in the range of about 200 kPa to about 8000 kPa.

5. The process of claim 1, wherein the contacting of step (b) is conducted at a temperature in the range of about 120° to about 260° C., and at a pressure in the range of about 500 kPa to about 5000 kPa.

6. The process of claim 1, wherein the contacting of step (b) is conducted at a feedstream flow rate in the range of about 0.1 h$^{-1}$ LWHSV to about 20 h$^{-1}$ LWHSV.

7. The process of claim 1,
    wherein the functions of the first catalyst and the second catalyst are performed by the same catalyst.

8. The process of claim 1,
wherein the first catalyst is a microporous molecular sieve selected from the group consisting of crystalline silicoaluminophosphates and aluminosilicates,
wherein said molecular sieve has been chemically treated to prevent catalytic activity outside the internal channels of the catalyst,
wherein the pore diameter of said molecular sieve restricts the catalytic formation of circular products inside the pores of the molecular sieve.

9. The process of claim 1, wherein the second catalyst comprises an acidic macroreticular ion-exchange resin.

10. The process of claim 1, wherein the first catalyst comprises at least two elements, one selected from Group 4 of the periodic table, and the other selected from Group 6 of the periodic table.

11. A process comprising the steps of:
(a) providing a biomass-derived feedstream comprising light glycols, wherein said glycols comprise molecules containing two, three or four carbon atoms;
(b) contacting the feedstream of step (a) with a first catalyst in a reactor, wherein the contacting results in an acidic condensation reaction that converts a least a portion of the feedstream to condensation products, wherein said condensation products comprise at least 4 carbon atoms at least one ether functional group, and one or more remaining hydroxyl functional groups;
(c) reducing at least a portion of the remaining hydroxyl groups on the condensation products from step (b) by combining the condensation products with a second catalyst in the presence of hydrogen to produce water and a liquid hydrocarbon mixture suitable for use as an additive for a liquid hydrocarbon fuel,
wherein the liquid hydrocarbon mixture has increased miscibility in liquid hydrocarbon fuels as a result of step c).

12. The process of claim 11, wherein the feedstream of step (a) comprises a member selected from the group consisting of ethylene glycol, propylene glycol, 1,3-propanediol, 1,2,-butanediol, 1,3,-butanediol, 2,3-butanediol, 1,4-butanediol and mixtures thereof.

13. The process of claim 11, further comprising combining the liquid hydrocarbon mixture of step (c) with a liquid hydrocarbon fuel to produce a improved liquid hydrocarbon fuel,
wherein the improved liquid hydrocarbon fuel has improved combustion properties relative to the original liquid hydrocarbon transportation fuel,
wherein said combustion properties comprise a member selected from the group consisting of increased cetane number, decreased emissions of environmental pollutants during combustion and combinations thereof.

14. The process of claim 11, wherein the contacting of step (b) is conducted at a temperature in the range of about 100° to about 300° C., and at a pressure in the range of about 200 kPa to about 8000 kPa.

15. The process of claim 11, wherein the contacting of step (b) is conducted at a temperature in the range of about 120° to about 260° C., and at a pressure in the range of about 500 kPa to about 5000 kPa.

16. The process of claim 11, wherein the contacting of step (b) is conducted at a feedstream flow rate in the range of about 0.1 h$^{-1}$ LWHSV to about 20 h$^{-1}$ LWHSV.

17. The process of claim 11,
wherein the functions of the first catalyst and the second catalyst are performed by the same catalyst.

18. The process of claim 11,
wherein the first catalyst is a macroporous molecular sieve selected from the group consisting of crystalline silicoaluminophosphates and aluminosilicates,
wherein said molecular sieve has been chemically treated to decrease catalytic activity outside the internal channels of the catalyst,
wherein the pore diameter of said molecular sieve restricts the catalytic formation of circular products inside the pores of the molecular sieve.

19. The process of claim 11, wherein the second catalyst comprises a commercial hydrotreating catalyst.

20. The process of claim 11, wherein the first catalyst comprises at least two elements, one selected from Group 4 of the periodic table, and the other selected from Group 6 of the periodic table.

* * * * *